3,059,166
ARRANGEMENT FOR THE PROTECTION OF SEMI-CONDUCTOR RECTIFIERS CONNECTED IN PARALLEL
Bjarne Storsand, Watt, Zurich, and Karl Orel, Zurich, Switzerland, assignor to Oerlikon Engineering Company, Zurich, Switzerland, a corporation of Switzerland
Filed Jan. 22, 1960, Ser. No. 4,141
Claims priority, application Switzerland Jan. 29, 1959
4 Claims. (Cl. 321—14)

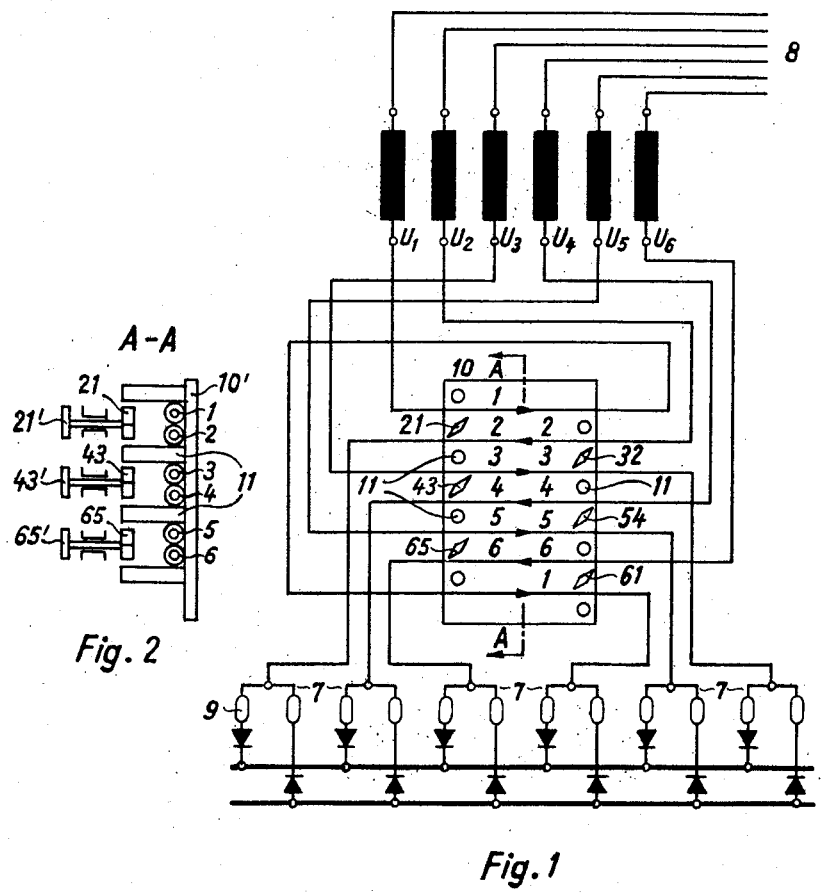
Fig. 2
Fig. 1
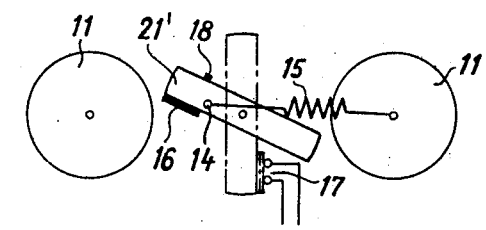
Fig. 3
INVENTORS:
BJARNE STORSAND
and KARL OREL
BY Frederick Breitenfeld
ATTORNEY INVENTORS:
BJARNE STORSAND
and KARL OREL United States Patent Office 3,059,166
Patented Oct. 16, 1962

In semi-conductor rectifier plants a large number of rectifier elements in a phase must be connected in parallel since semi-conductor rectifiers can only be produced for comparatively low-rated currents. Due to short-circuits in a rectifier element or owing to a punctured safety fuse connected in series with a rectifier element or respectively a rectifier bridge, or even in consequence of a change of the conductibility of a rectifier, e.g. in the case of bad contacts, an unequal distribution of the phase current to the single rectifier elements may occur in the said parallel connection. This leads to overloading of some rectifiers and to their destruction.

Said defects can be avoided if, according to the present invention, the interconnections between a transformer secondary phase and the direct current contact rails are conducted by groups through a magnetic system in such a way that a formation of differences of the flow occurs and that means are provided which, if a difference of circulation exceeding null occurs, condition the action of protecting measure. The advantage of the invention is, that in a most simple way there is a possibility to protect a large number of semi-conductor rectifier elements against dangerous current differences in the supply lines.

According to a preferred form of execution of the invention a magnetic system in shape of a cable rake can be provided to seize the difference in the magnetic flux, the teeth of this rake together with intermediary keepers forming individual magnetic circuits. At predetermined points of the cable rake gaps of inferior magnetic conductibility may be provided which prevent the possibility of influences exerted by the flow difference on magnetic circuits connected in parallel.

The formation of differences of the magnetic flux can be obtained either by a push-pull of conductors or in such a manner that a phase shift by 180° of the transformer secondary windings belonging to a primary phase takes place.

It is especially advantageous to conduct the interconnections between a transformer secondary phase and the rectifier elements in pairs under cyclic permutation of the connections through the individual magnetic systems, each connection belonging to two magnetic systems. The arrangement of only two conductors in a push-pull allows of seizing every current asymmetry in the plant. In a push-pull of several conductors this is no more the case, since simultaneous current variations of equal magnitude can occur in various conductors and subsequently compensate each other.

According to another example of execution of the present invention a trip coil is provided on each magnetic system which is influenced by the variation of the flux difference.

Finally it is also possible to conduct the connections of several rectifier bridges to the direct current contact rails in groups through the magnetic system. This allows of decreasing considerably the necessary flow comparisons.

Some examples of the object of invention are shown schematically on the attached drawings in which—

FIG. 1 shows the use of the invention for six semi-conductor rectifier bridges connected in parallel;

FIG. 2 shows a section A (of FIG. 1) across the cable rake;

FIG. 3 shows a possible execution of the tripping device;

Figure 4:
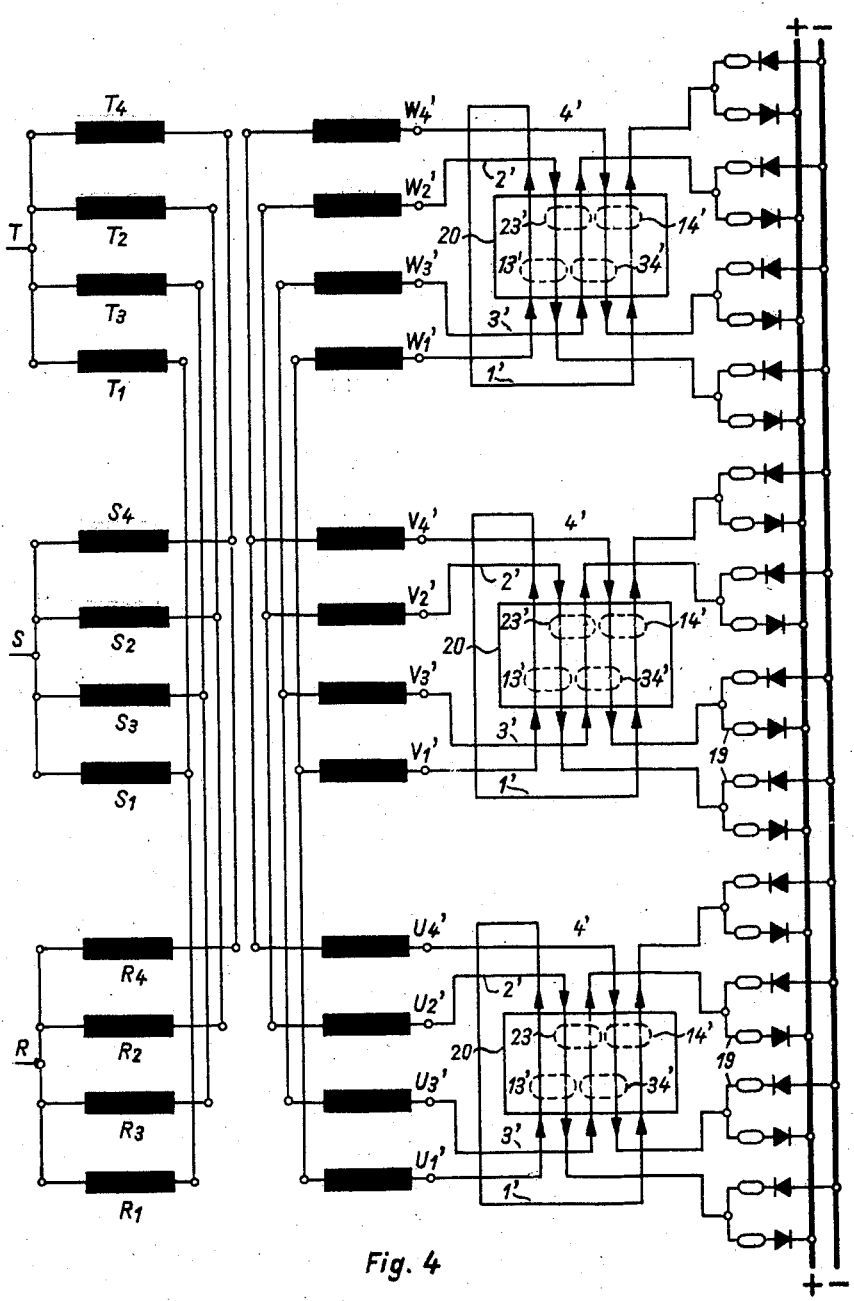
FIG. 4 shows the use of the invention in a three-phase system.

According to FIG. 1 the rectifier transformer secondary windings are marked $U_1$ to $U_6$, each winding being associated to a rectifier bridge 7. These secondary windings, belonging to the same phase, can be star-connected with two further phases over the lines 8. The connections from the secondary windings to the rectifier bridges show the reference marks 1 to 6. 9 is a safety fuse connected in series with each rectifier. 10 is a top view of the magnetic system. The push-pull of conductors only occurs on a short section of about 10 cms. The teeth of the magnetic conductor are marked with the reference number 11. The possible flow difference in the conductors 1 and 2 influences the keeper 21, the difference in the conductors 2 and 3 acts upon keeper 32 and so on.

FIG. 2 shows similar parts with the same reference marks as shown in FIG. 1. 10' is the base plate of the magnetic system. The keeper 21 acts upon the tripping device 21', the keeper 43 upon the tripping device 43' etc. The method of operation of the arrangement may be explained in relation with FIG. 3. 11 indicates again two teeth of the cable rake in a top view. Cutting in occurs with a flow difference arising when a magnetic flux is formed in the magnetic system embracing the feeder lines to the rectifiers. The field arising between two teeth causes the keeper to take a horizontal position. The excentric working point 14 of spring 15 causes the keeper 21 to snap, said keeper bridging contacts 17 and indicating the fault by the changed position of the tripping device 21'. 18 is a counter-piece holding the keeper in a rapid-acting position. The shown tripping device with tripping armatures and contacts can be mounted in a box of non-magnetic material which is fixed between the teeth 11, e.g. by a screw.

In FIG. 4, R, S, T mark the individual phases on the primary side of the transformer. The current of each secondary phase is rectified over four rectifier bridges 19. $R_1$ to $R_4$ and $S_1$ to $S_4$ or $T_1$ to $T_4$ mark the single coils of the star-connected primary windings. $U'_1$ to $U'_4$ and $V'_1$ to $V'_4$ or $W'_1$ to $W'_4$ are the corresponding secondary windings, associated to a rectifier bridge. The lines 1' to 4' conduct from said windings to the rectifier bridges 19. 20 marks a magnetic system according to the invention. The dash-lines 13', 23', 34' and 14' mark the individual magnetic circuits. These circuits may be separate from each other, by providing gaps with low conductibility. In the same manner the protective device for phases S and T is arranged, where same parts are marked with same reference numbers.

Figure 5:
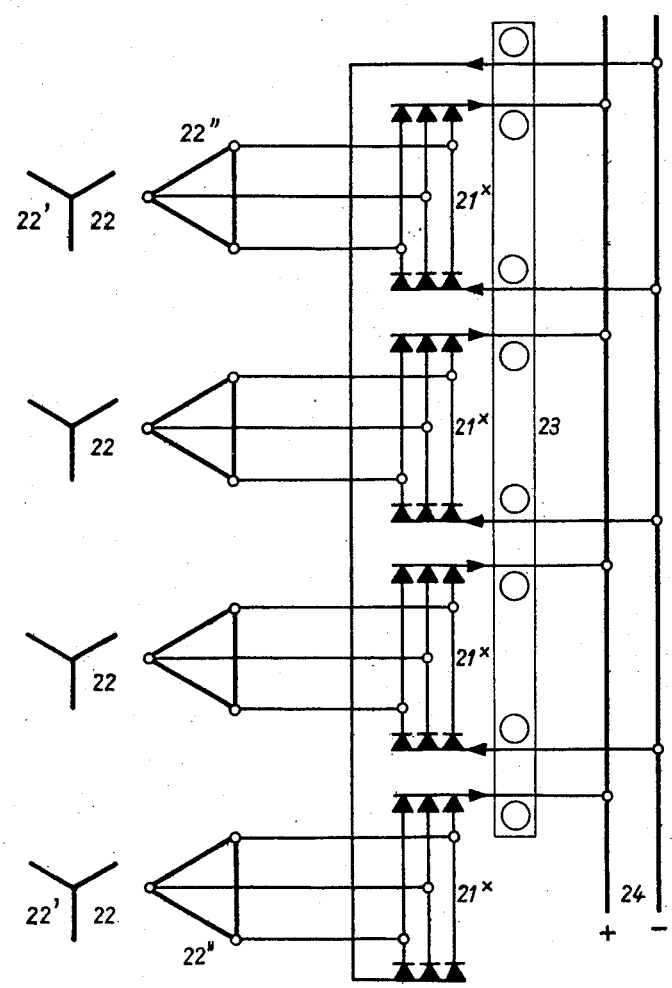
FIG. 5 shows the arrangement of the invention for three-phase rectifier bridges.

According to FIG. 5 the protecting device has been applied on four three-phase semi-conductor rectifier bridges 21' connected in parallel and being associated to the three phases of a transformer 22. 22" are the secondary windings 22' the primary windings of the transformer. The push-pull in the cable rake is effectuated by means of the lines leading from the rectifier bridges to the direct current contact rails 24.

Having now particularly described and ascertained the nature of our said invention and in what manner the same is to be performed, we declare that what we claim is:

1. In a semi-conductor rectifier installation including a rectifier transformer having a plurality of partial secondary windings, a plurality of rectifiers connected in parallel, and a conductor leading from each of said secondary windings to one of said rectifiers, only one of said conductors leading to any one rectifier, a magnetic arrangement for protecting said rectifiers comprising a plurality of magnetic circuits, two of said conductors being led through each of said circuits and each conductor being led through two of said circuits in such a way as to produce magnetomotive forces in each circuit in opposite directions, said forces normally being equal, and means forming part of said circuit for detecting any resultant magnetomotive force greater than zero in said circuit and initiating action to protect said rectifiers upon the detection of such a resultant force.

2. In a semi-conductor rectifier installation, the elements defined in claim 1 wherein said magnetic arrangement comprises a cable rake including a base plate and teeth projecting from said plate, two conductors running along said plate between each pair of adjacent teeth, and said detecting means is an armature or keeper spaced from said base plate and pivotally mounted between each pair of adjacent teeth, said base plate, each pair of teeth, and keeper forming one of said magnetic circuit.

3. In a semi-conductor rectifier installation, the elements defined in claim 2 including a spring for normally maintaining said keeper out of alignment with said teeth, but said keeper being swingable into alignment with said teeth against the force of said spring when a resultant magnetomotive force is produced in said magnetic circuit.

4. In a semi-conductor rectifier installation, the elements defined in claim 3 including a member pivotable with said keeper into an actuated position wherein it initiates action to protect said rectifiers, and wherein said spring is eccentrically mounted on said keeper in such a way that when said keeper swings into alignment with said teeth said spring will cause said keeper to continue swinging past its alignment position until said member reaches its actuated position.

References Cited in the file of this patent

UNITED STATES PATENTS 2,949,568    Dortort _____ Aug. 16, 1960

FOREIGN PATENTS 125,815    Switzerland _____ Mar. 16, 1928